(12) United States Patent
Suzuki et al.

(10) Patent No.: US 11,414,836 B2
(45) Date of Patent: Aug. 16, 2022

(54) WORK MACHINE

(71) Applicant: HITACHI CONSTRUCTION MACHINERY CO., LTD., Tokyo (JP)

(72) Inventors: Yusuke Suzuki, Tsuchiura (JP); Hiroshi Sakamoto, Hitachi (JP); Mariko Mizuochi, Hitachinaka (JP); Hiroaki Tanaka, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 509 days.

(21) Appl. No.: 16/493,423

(22) PCT Filed: Apr. 23, 2018

(86) PCT No.: PCT/JP2018/016494
§ 371 (c)(1),
(2) Date: Sep. 12, 2019

(87) PCT Pub. No.: WO2019/053936
PCT Pub. Date: Mar. 21, 2019

(65) Prior Publication Data
US 2020/0131737 A1    Apr. 30, 2020

(30) Foreign Application Priority Data

Sep. 15, 2017  (JP) .............................. JP2017-178365

(51) Int. Cl.
*E02F 9/22*   (2006.01)
*E02F 3/43*   (2006.01)
(Continued)

(52) U.S. Cl.
CPC ............ *E02F 9/2296* (2013.01); *E02F 3/435* (2013.01); *B60Y 2200/412* (2013.01); *E02F 3/32* (2013.01);
(Continued)

(58) Field of Classification Search
CPC . E02F 3/435; E02F 3/32; E02F 9/2214; F15B 2211/6346; F15B 2211/6336
See application file for complete search history.

(56) References Cited

U.S. PATENT DOCUMENTS 5,217,126 A * 6/1993 Hayashi ................ B66C 23/905
212/277
2014/0121840 A1  5/2014 Mizuochi et al.
(Continued)

FOREIGN PATENT DOCUMENTS

JP   09-041421 A    2/1997
JP   2000-130402 A  5/2000
(Continued)

OTHER PUBLICATIONS

Extended European Search Report received in corresponding European Application No. 18 85 7245 dated Oct. 20, 2021.
International Preliminary Report on Patentability received in corresponding International Application No. PCT/JP2018/016494 dated Mar. 26, 2020.
International Search Report of PCT/JP2018/016494 dated Jul. 17, 2018.

*Primary Examiner* — Abiy Teka
(74) *Attorney, Agent, or Firm* — Mattingly & Malur, PC

(57) ABSTRACT

Provided is a work machine that, within the limit of not harming dynamic stability, can perform work utilizing the impact generated when a cylinder driving a front work implement collides with a stroke end. A drive control system 34 includes: a stroke end distance calculation and evaluation section 34c that determines whether or not it is possible for cylinders 20A and 21A to collide with a stroke end; a dynamic center of gravity position prediction section 34d that, when the stroke end distance calculation and evaluation section determines that it is possible for the cylinders to collided on the stroke end, predicts a trajectory of the dynamic center of gravity position of a hydraulic excavator 1 from a time when a decelerating operation of the cylinder starts to a time when the cylinder stops; and an allowable velocity changing section 34f that changes the allowable (Continued)

velocity of the cylinder according to a minimum distance from the trajectory of the dynamic center of gravity position predicted by the dynamic center of gravity position prediction section to a tipping line of the hydraulic excavator.

3 Claims, 9 Drawing Sheets

(51) Int. Cl.
*E02F 3/32* (2006.01)
*E02F 9/20* (2006.01)
*E02F 9/26* (2006.01)

(52) U.S. Cl.
CPC ............. *E02F 9/2004* (2013.01); *E02F 9/264* (2013.01); *F15B 2211/6336* (2013.01); *F15B 2211/6346* (2013.01)

(56) References Cited

U.S. PATENT DOCUMENTS

2015/0361641 A1* 12/2015 Urbanowicz ......... E02F 9/2214
 91/363 R
2016/0369480 A1 12/2016 Mizuochi et al.
2017/0284056 A1* 10/2017 Mizuochi .............. E02F 9/2203

FOREIGN PATENT DOCUMENTS

| | | |
|---|---|---|
| JP | 2013-113004 A | 6/2013 |
| JP | 2013-204260 A | 10/2013 |
| JP | 2017-008501 A | 1/2017 |
| WO | 2014/013877 A1 | 1/2014 |

* cited by examiner

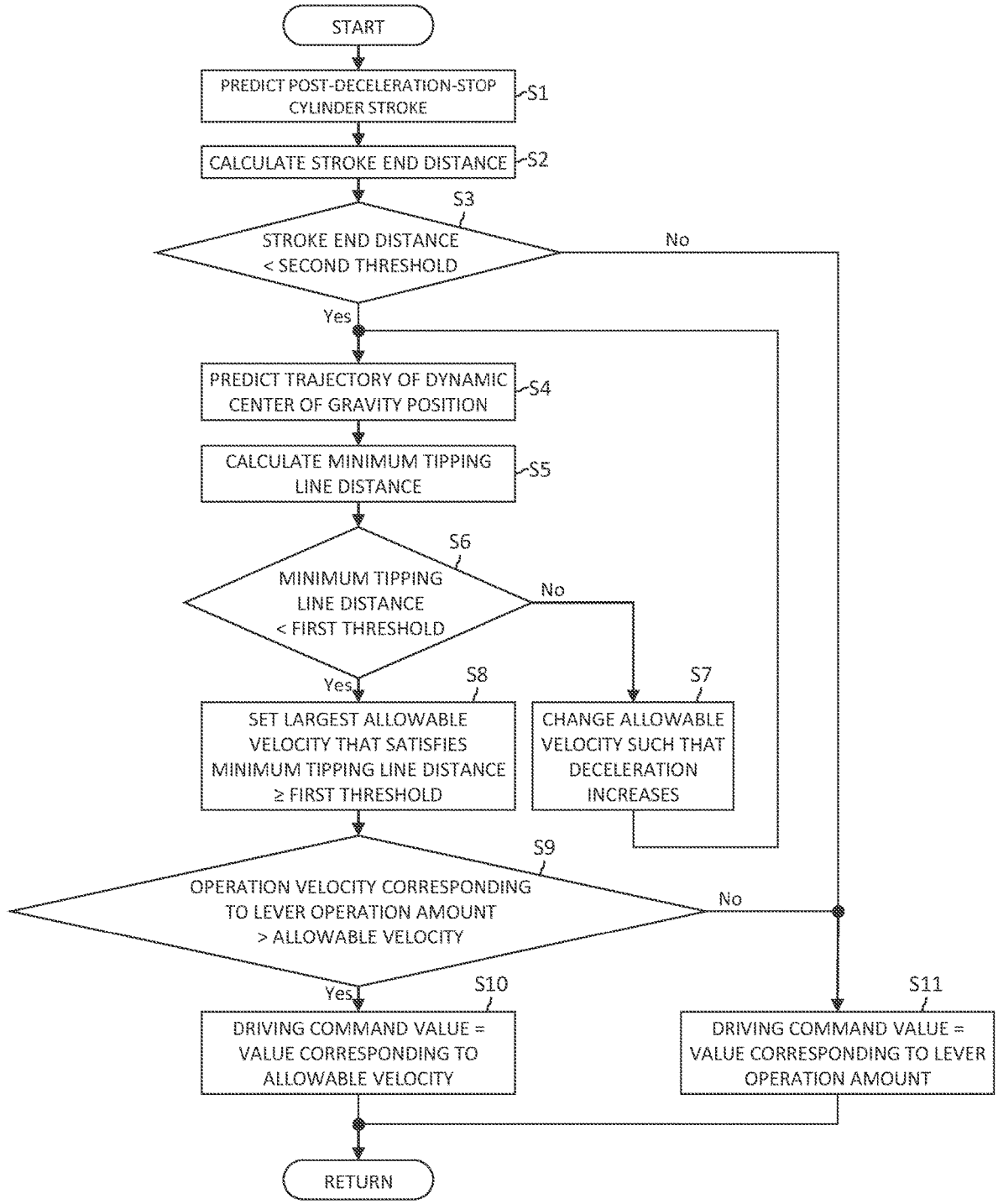

WORK MACHINE

TECHNICAL FIELD

The present invention relates to a work machine used for structure demolition work, waste disposal, scrap handling, road construction, construction work, civil engineering works or the like.

BACKGROUND ART

As a work machine for use in structure demolition work, waste disposal, scrap handling, road construction, construction work, civil engineering works or the like, there has been known a machine in which a swing structure is swingably mounted to an upper portion of a track structure traveling by a driving system, an articulated front work implement is mounted to the swing structure in a vertically rotatable manner, and each of front members constituting the front work implement is driven by a cylinder. Examples of such a machine include a hydraulic excavator having a front work implement including a boom, an arm and a bucket. The boom, the arm and the bucket are driven by a boom cylinder, an arm cylinder and a bucket cylinder, respectively.

In this kind of work machine represented by a hydraulic excavator, when the cylinder driving the front work implement collides with a stroke end, an impact is generated in the work machine due to the action of the collision, and, depending on the magnitude of the impact, the work machine may loose balance and may tilt or, if worse comes to worst, may tip. In view of this, there has been known a drive control system that performs deceleration control in the vicinity of a stroke end, for the purpose of mitigating the impact generated upon collision of the cylinder with the stroke end and restraining the tilting or tipping of the work machine (for example, Patent Document 1).

Patent Document 1 describes a drive control system for a hydraulic cylinder that, when a work implement is operated by extending or contracting the hydraulic cylinder by an operation signal from operation means, performs deceleration control of the hydraulic cylinder when the hydraulic cylinder reaches the vicinity of a stroke end, to mitigate the impact at the stroke end. The drive control system for the hydraulic cylinder includes operation signal detection means for detecting the operation signal from the operation means, and deceleration control canceling means that, when the operation signal is once reduced to below a predetermined value at the time when the hydraulic cylinder reaches the vicinity of the stroke end and the deceleration control is performed, cancels the deceleration control of the hydraulic cylinder while the hydraulic cylinder is in the vicinity of the stroke end (claim 1).

According to this drive control system for the hydraulic cylinder, work can be easily conducted even when the hydraulic cylinder is in the vicinity of the stroke end, while maintaining the function of mitigating the impact when the hydraulic cylinder reaches the stroke end, so that workability and operability in the vicinity of the stroke end are enhanced.

PRIOR ART DOCUMENT

Patent Document

Patent Document 1: JP-2000-130402-A

SUMMARY OF THE INVENTION

Problem to be Solved by the Invention

In a hydraulic excavator, an operation of causing a bucket cylinder or an arm cylinder to collide with a stroke end may be conducted, for the purpose of dropping mud adhering to a bucket and an arm. In addition, at the time of work in a narrow place, an operation of causing the arm cylinder to collide with the stroke end on the arm crowding side to bring the arm into sudden stop may be conducted for the purpose of causing the earth and sand contained in the bucket to fly closer to the vicinity of the machine body. Further, at the time of work in a broad place, an operation of causing the arm cylinder to collide with the stroke end on the arm dumping side to bring the arm into sudden stop may be conducted for the purpose of causing the earth and sand contained in the bucket to fly farther than a movable range of the front work implement.

However, in the drive control system for the hydraulic cylinder described in Patent Document 1, when the hydraulic cylinder reaches the vicinity of the stroke end and the operation signal is once reduced to below a predetermined value, the deceleration control of the hydraulic cylinder is canceled only while the hydraulic cylinder is in the vicinity of the stroke end. Therefore, even if the operation means is operated such as to operate the hydraulic cylinder in the stroke end direction in a state in which the deceleration control of the hydraulic cylinder is canceled, the distance to the stroke end of the hydraulic cylinder is very short, and the stroke end is reached before the cylinder velocity is raised sufficiently, so that a large impact is not generated even if the deceleration control of the hydraulic cylinder is not conducted. For this reason, a work utilizing the impact upon stroke end collision cannot be performed even when the deceleration control of the hydraulic cylinder is canceled.

The present invention has been made in consideration of the above-mentioned problem. It is an object of the present invention to provide a work machine capable of performing a work utilizing an impact generated when a cylinder driving a front work implement collides with a stroke end, within the limit of not harming dynamic stability.

Means for Solving the Problem

In order to achieve the above object, according to the present invention, there is provided a work machine including: a machine body; a front work implement mounted to a front portion of the machine body in a vertically rotatable manner; at least one cylinder that drives the front work implement; an operation input device for instructing an operation of the cylinder; and a drive control system that controls driving of the cylinder in accordance with an instruction from the operation input device, the drive control system, when the cylinder approaches a stroke end, decelerating the cylinder by correcting an operation velocity instructed by the operation input device to or below a preset allowable velocity, in which the drive control system includes: a stroke end distance calculation and evaluation section that determines whether or not it is possible for the cylinder to collide with the stroke end; a dynamic center of gravity position prediction section that, when it is determined by the stroke end distance calculation and evaluation section that it is possible for the cylinder to collide with the stroke end, predicts a trajectory of the dynamic center of gravity position of the work machine from a time when a deceleration operation of the cylinder starts to a time when the cylinder stops; and an allowable velocity changing section that changes the allowable velocity in accordance with a minimum distance from the trajectory of the dynamic center of gravity position predicted by the dynamic center of gravity position prediction section to a tipping line of the work machine.

According to the present invention configured as above, when it is possible for the cylinder driving the front work implement to collide with a stroke end, the trajectory of the dynamic center of gravity position of the work machine from the time when a cylinder decelerating operation starts to the time when the cylinder stops is predicted, and the allowable velocity of the cylinder is changed according to the minimum distance from the trajectory of the dynamic center of gravity position to the tipping line of the work machine, whereby an impact can be generated at the time when the cylinder collides with the stroke end, within the limit of not harming dynamic stability of the work machine.

Advantages of the Invention

According to the present invention, a work utilizing the impact generated when the cylinder driving the front work implement collides with a stroke end can be performed, within the limit of not harming dynamic stability of the work machine.

BRIEF DESCRIPTION OF THE DRAWINGS

FIG. 11 is a flow chart depicting processing of the drive control system.

MODE FOR CARRYING OUT THE INVENTION

Figure 1:
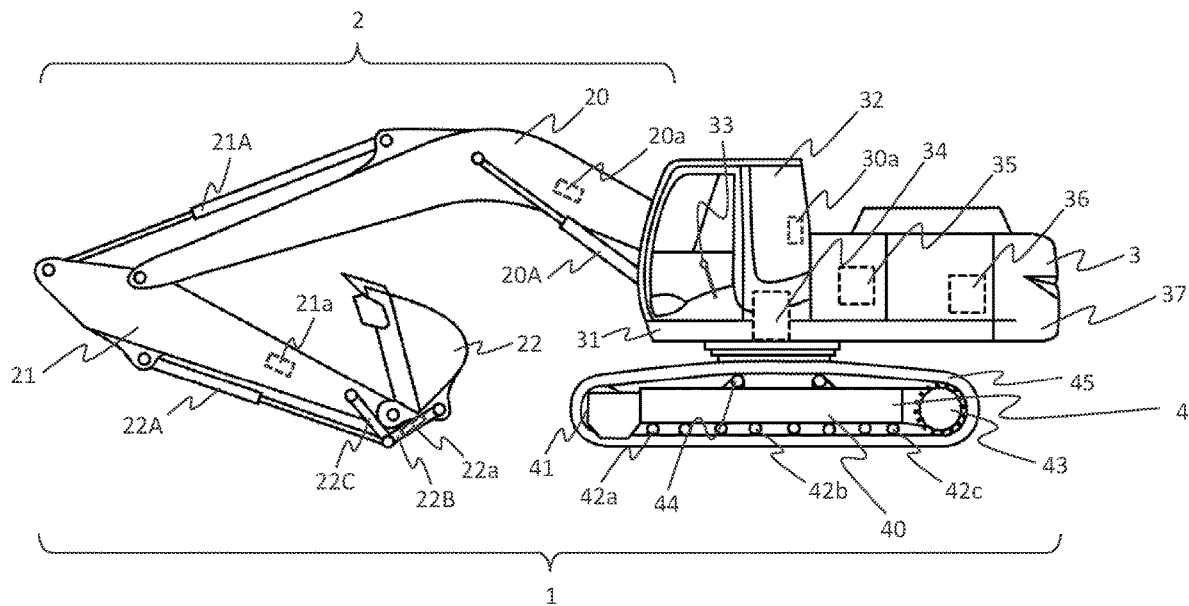
FIG. 1 is a side view of a hydraulic excavator according to an embodiment of the present invention.

A hydraulic excavator, taken as an example of a work machine according to an embodiment of the present invention, will be described below referring to the drawings. Note that in the drawings, the same or equivalent members are denoted by the same reference characters, and repeated description thereof will be omitted.

<Hydraulic Excavator>

FIG. 1 is a side view of a hydraulic excavator according to the present embodiment.

As depicted in FIG. 1, the hydraulic excavator 1 includes a front work implement 2, and a machine body including a swing structure 3 and a track structure 4.

The front work implement 2 includes: a boom 20 mounted to a front portion of the swing structure 3 in a vertically rotatable manner; an arm 21 mounted to a tip portion of the boom 20 in a vertically or front-rear directionally rotatable manner; a bucket 22 mounted to a tip portion of the arm 21 in a vertically or front-rear directionally rotatable manner; a boom cylinder 20A having one end linked to a front portion of the swing structure 3 and having the other end linked to an intermediate portion of the boom 20; an arm cylinder 21A having one end linked to an intermediate portion of the boom 20 and having the other end linked to a base end portion of the arm 21; and a bucket cylinder 22A having one end linked to a base end portion of the arm 21 and having the other end linked to a tip portion of the arm 21 through an arm link 22C and linked to a base end portion of the bucket 22 through a bucket link 22B. The boom 20 is rotated vertically by extending and contracting operations of the boom cylinder 20A. The arm 21 is rotated vertically or front-rear directionally by extending and contracting operations of the arm cylinder 21A. The bucket 22 is rotated vertically or front-rear directionally by extending and contracting operations of the bucket cylinder 22A. Note that the bucket 22 can be replaced by another work tool such as a grapple, a breaker, a ripper, and a magnet.

A boom IMU sensor 20a that detects angular velocity and acceleration of the boom 20 is attached to the boom 20. An arm IMU sensor 21a that detects angular velocity and acceleration of the arm 21 is attached to the arm 21. A bucket IMU sensor 22a that detects angular velocity and acceleration of the bucket 22 is attached to the bucket link 22B. A swing structure IMU sensor 30a that detects angular velocity and acceleration of the swing structure 3 is attached to a cab 32.

The swing structure 3 includes a main frame 31, the cab 32, an operation input device 33, a drive control system 34, an engine 35, a drive system 36, and a counterweight 37. The cab 32, the drive control system 34, the engine 35, the drive system 36 and the counterweight 37 are disposed on the main frame 31.

The operation input device 33 is provided in the cab 32, and includes a plurality of operation levers operated by tilting by an operator and operation input amount sensors 33a, 33b and 33c (depicted in FIG. 4) that detect the tilting amount (lever operation amounts) of the operation levers. The drive control system 34 controls the operation of actuators including the boom cylinder 20A, the arm cylinder 21A and the bucket cylinder 22A, based on instructions from the operation input device 33. The engine 35 generates power necessary for operating the hydraulic excavator 1. The drive system 36 drives the actuators including the boom cylinder 20A, the arm cylinder 21A and the bucket cylinder 22A, based on drive command values decided by the drive control system 34. The counterweight 37 is disposed on the rear side of the hydraulic excavator 1 for establishing a weight balance required at the time of operations of the hydraulic excavator 1.

The track structure 4 includes a track frame 40, a front idler 41, lower rollers 42a, 42b and 42c, a sprocket 43, upper rollers 44, and a crawler 45. The front idler 41, the lower rollers 42a, 42b and 42c, the sprocket 43 and the upper rollers 44 are rotatably disposed on the track frame 40, and the crawler 45 is mounted such as to be able to go round the periphery of the track frame 40 through these members. Note that the numbers of the lower rollers 42a, 42b and 42c and the upper rollers 44 are varied according to the scale of the track structure 4, and, in the case where the scale of the track structure 4 is small, the lower rollers 42a, 42b and 42c and the upper rollers 44 may not be disposed. In addition, the track structure 4 is not limited to one that has the crawler 45 but may be one that has traveling wheels or bases. The operator can cause the hydraulic excavator 1 to travel through the crawler 45, by operating the operation levers of the operation input device 33 and thereby regulating the rotating velocities of the sprocket 43.

<Center of Gravity Position>

Figure 2:
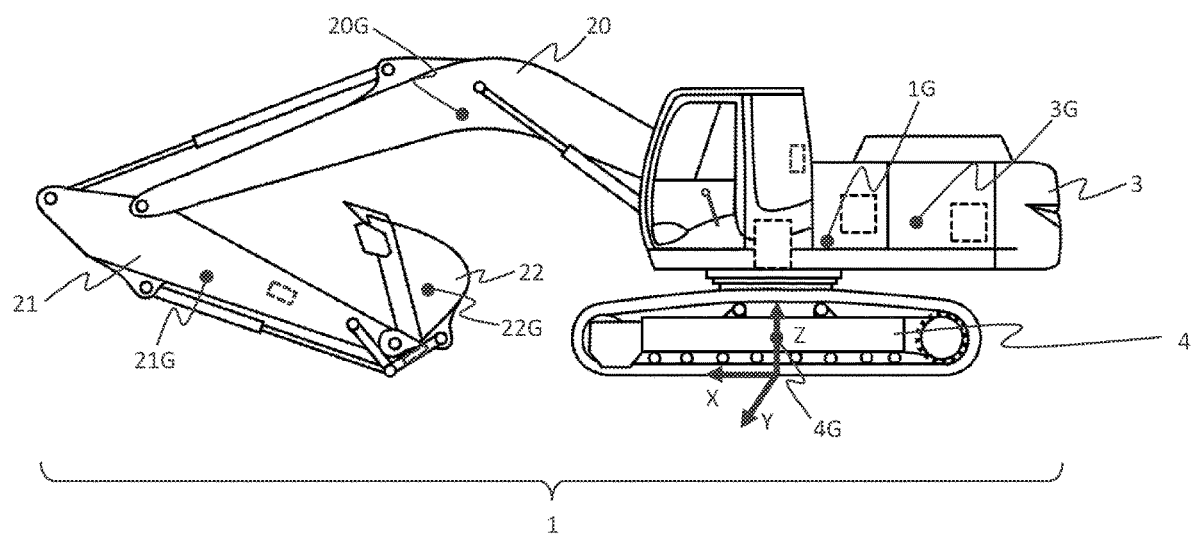
FIG. 2 is a figure depicting center of gravity positions of constituent members of the hydraulic excavator.

FIG. 2 is a diagram depicting a computation model for determining the center of gravity position of the hydraulic excavator 1.

As depicted in FIG. 2, in the present embodiment, in consideration of simplicity of mounting, a concentrated mass point model in which the mass of each constituent member is concentrated in the center of gravity of the member is used as a computation model for determining the center of gravity position of the hydraulic excavator 1. In FIG. 2, a point at which the swing center axis of the swing structure 3 intersects the ground is taken as an original, the traveling direction of the track structure 4 is taken as an X direction, the direction of a normal to the ground is taken as a Z direction, and the direction orthogonal to both the X direction and the Z direction is taken as a Y direction. In addition, the center of gravity position is considered on the XZ plane.

A hydraulic excavator center of gravity 1G is located at a position obtained by composing a boom center of gravity 20G, an arm center of gravity 21G, a bucket center of gravity 22G, a swing structure center of gravity 3G, and a track structure center of gravity 4G.

The boom center of gravity 20G is located at a position obtained by composing the respective centers of gravity of the boom 20, the boom cylinder 20A and the boom IMU sensor 20a.

The arm center of gravity 21G is located at a position obtained by composing the respective centers of gravity of the arm 21, the arm cylinder 21A and the arm IMU sensor 21a.

The bucket center of gravity 22G is located at a position obtained by composing the respective centers of gravity of the bucket 22, the bucket link 22B, the arm link 22C, the bucket cylinder 22A and the bucket IMU sensor 22a.

The swing structure center of gravity 3G is located at a position obtained by composing the respective centers of gravity of the swing structure IMU sensor 30a, the main frame 31, the cab 32, the operation input device 33, the drive control system 34, the engine 35, the drive system 36 and the counterweight 37.

The track structure center of gravity 4G is located at a position obtained by composing the respective centers of gravity of the front idler 41, the lower rollers 42a, 42b and 42c, the sprocket 43 and the upper rollers 44.

Note that the method of setting the mass points is not limited to this, and parts where the mass points are concentrated may be added or integrated. For example, the mass of earth and sand may be added to the mass of the bucket 22.

<Tipping Line>

A tipping line is defined as "a line obtained by connecting points serving as fulcrums in tilting" in JIS A 8403-1: 1996, Earth-moving machinery—Hydraulic excavators —Part 1: Terminology and commercial specifications. The tipping line of the hydraulic excavator 1 will be described using FIG. 3.

Figure 3:
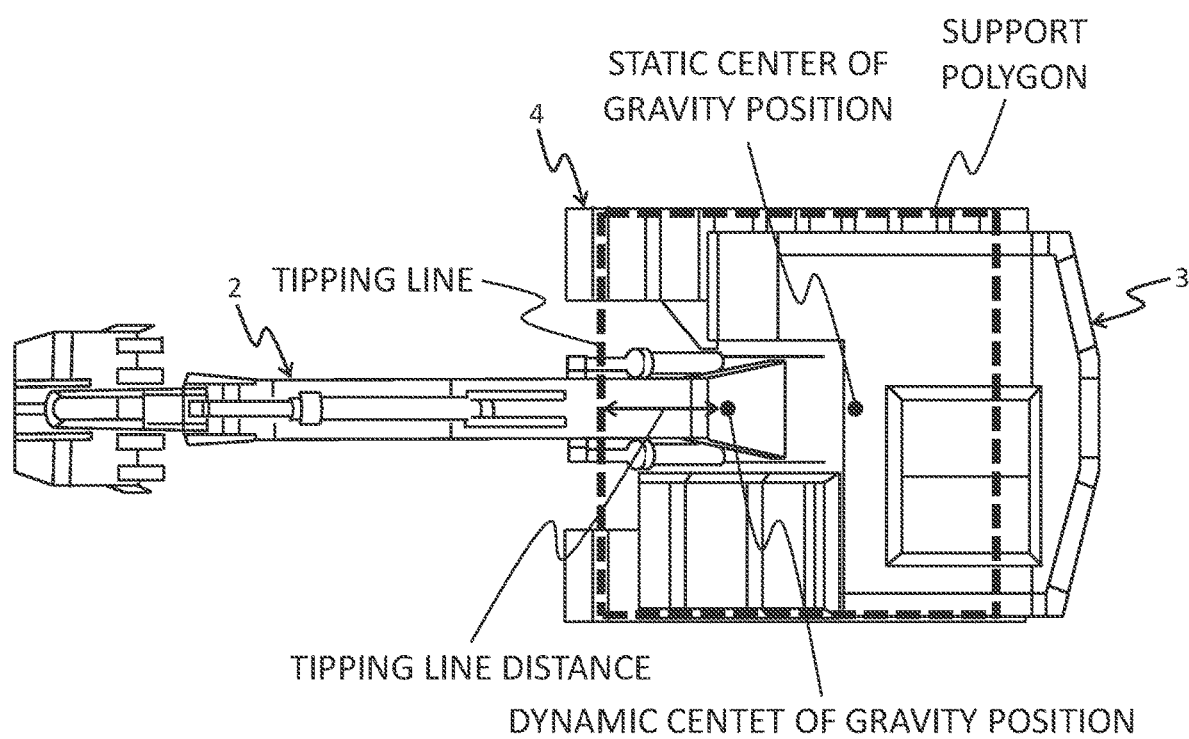
FIG. 3 is a figure depicting the positional relations of a static center of gravity position, a dynamic center of gravity position and a tipping line of the hydraulic excavator.

In FIG. 3, a support polygon of the hydraulic excavator 1 is indicated by broken line. The support polygon of the hydraulic excavator 1 is a tetragon obtained by connecting the points of contact between the crawler 45 and the ground in such a manner that the resulting figure is not recessed. In the present embodiment, as depicted in FIG. 1, the front idler 41 and the sprocket 43 are mounted at positions slightly above the lower rollers 42a, 42b and 42c, and, therefore, the crawler 45 does not make contact with the ground under the front idler 41 and the sprocket 43. Accordingly, a side of the support polygon (tetragon) located on the front side of the track structure 4 is located at the position of the lower roller 42a disposed on the most front side of the crawler 45, while a side of the support polygon (tetragon) located on the rear side of the track structure 4 is located at the position of the lower roller 42c disposed on the most rear side of the crawler 45.

The tipping line is that one of the four sides constituting the support polygon (tetragon) which is intersected by a straight line extended from the static center of gravity position 1Gs of the hydraulic excavator 1 toward the dynamic center of gravity position 1Gd. In the example depicted in FIG. 3, the dynamic center of gravity position 1Gd is located on the front side of the track structure 4 as viewed from the static center of gravity position 1Gs, so that the side of the support polygon (tetragon) which side is located on the front side of the track structure 4 is the tipping line. The static center of gravity position 1Gs varies according to the posture of the front work implement 2 and the angle (swing angle) of the swing structure 3. The dynamic center of gravity position 1Gd varies according to inertial forces generated when the front work implement 2 and the swing structure 3 are operated, as well as the posture of the front work implement 2 and the angle (swing angle) of the swing structure 3. Depending on the positional relationship between the static center of gravity position 1Gs and the dynamic center of gravity position 1Gd, the side of the support polygon (tetragon) which is located on the left or right side or the rear side of the track structure 4 will be the tipping line.

According to a ZMP stability discrimination criterion which will be described later, the distance from the dynamic center of gravity position 1Gd of the hydraulic excavator 1 to the tipping line (hereinafter referred to as a tipping line distance) becomes an index value representing the stability of the hydraulic excavator 1. As the distance from the dynamic center of gravity position 1Gd to the tipping line (the tipping line distance) is smaller, the possibility of tilting of the machine body is higher.

Note that if the distance from the center of the track structure 4 to the tipping line is substantially the same in the front-rear and left-right directions, a circle having a center at the rotational center of the swing structure 3 may be taken as the tipping line, in consideration of simplicity of mounting.

<State Quantity Detection Means>

Figure 4:
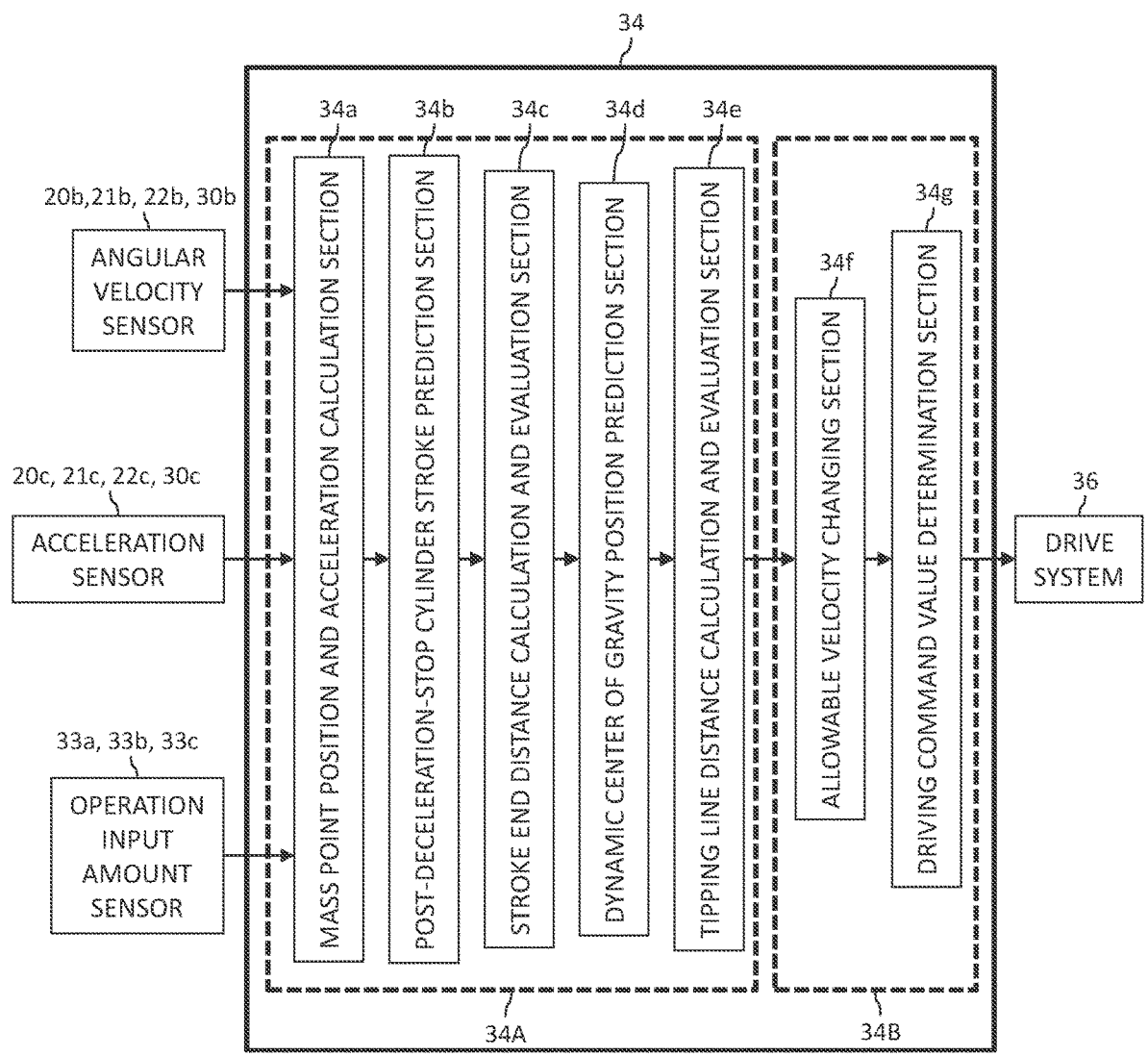
FIG. 4 is a functional block diagram of a drive control system.

The swing structure IMU sensor 30a (depicted in FIG. 1) includes an angular velocity sensor 30b and an acceleration sensor 30c (depicted in FIG. 4). The boom IMU sensor 20a (depicted in FIG. 1) includes an angular velocity sensor 20b and an acceleration sensor 20c (depicted in FIG. 4). The arm IMU sensor 21a (depicted in FIG. 1) includes an angular velocity sensor 21b and an acceleration sensor 21c (depicted in FIG. 4). The bucket IMU sensor 22a (depicted in FIG. 1)

includes an angular velocity sensor 22b and an acceleration sensor 22c (depicted in FIG. 4).

Respective ground angles and angular velocities of the swing structure 3, the boom 20, the arm 21 and the bucket 22 can be determined by the angular velocity sensors 30b, 20b, 21b and 22b and the acceleration sensors 30c, 20c, 21c and 22c. In other words, the posture of the hydraulic excavator 1 can be acquired. In addition, the positions and accelerations of the swing structure center of gravity 3G, the boom center of gravity 20G, the arm center of gravity 21G and the bucket center of gravity 22G can be determined on a three-dimensional basis, from the mechanical link relations of the constituent members. Note that an IMU sensor may be attached also to the track structure 4, such as to determine the position and acceleration of the track structure center of gravity 4G.

Since the track structure 4 in the present embodiment is rotated only on the XY plane relative to the swing structure 3, the positions and accelerations in the X direction and the Z direction are determined from mechanical limitations and the swing structure IMU sensor 30a, in consideration of simplicity of mounting.

Note that the state quantity detection means described here are an example, and the means for detecting the posture and acceleration of the hydraulic excavator 1 may be those which directly measure the relative angles of the parts of the front work implement 2, or those which detect the strokes and velocities of the boom cylinder 20A, the arm cylinder 21A and the bucket cylinder 22A and convert the detected values into posture and acceleration of the hydraulic excavator 1.

The operation input device 33 includes a boom operation input amount sensor 33a (depicted in FIG. 4) by which the tilting amount of an operation lever corresponding to the boom 20 is detected as an operation command value corresponding to an operation velocity of the boom cylinder 20A, an arm operation input amount sensor (depicted in FIG. 4) by which the tilting amount of an operation lever corresponding to the arm 21 is detected as an operation command value corresponding to an operation velocity of the arm cylinder 21A, and a bucket operation input amount sensor 33c (depicted in FIG. 4) by which the tilting amount of an operation lever corresponding to the bucket 22 is detected as an operation command value corresponding to an operation velocity of the bucket cylinder 22A. As a result, the operating velocities of the cylinders 20A, 21A and 22A can be changed by regulating the tilting amounts of the operation levers by the operator.

<Drive Control System>

FIG. 4 is a functional block diagram of the drive control system 34 depicted in FIG. 1.

As depicted in FIG. 4, the drive control system 34 includes a calculation block 34A and a control block 34B. The calculation block 34A includes a mass point position and acceleration calculation section 34a, a post-deceleration-stop cylinder stroke prediction section 34b, a stroke end distance calculation and evaluation section 34c, a dynamic center of gravity position prediction section 34d, and a tipping line distance calculation and evaluation section 34e. The control block 34B includes an allowable velocity changing section 34f and a driving command value decision section 34g.

The mass point position and acceleration calculation section 34a calculates the positions of mass points of the parts of the hydraulic excavator 1 and the accelerations at the mass point positions, based on information from the angular velocity sensors 20b, 21b, 22b and 30b and the acceleration sensors 20c, 21c, 22c and 30c. The angular velocity sensor 20b and the acceleration sensor 20c constitute the boom IMU sensor 20a (depicted in FIG. 1). The angular velocity sensor 21b and the acceleration sensor 21c constitute the arm IMU sensor 21a (depicted in FIG. 1). The angular velocity sensor 22b and the acceleration sensor 22c constitute the bucket IMU sensor 22a (depicted in FIG. 1). The angular velocity sensor 30b and the acceleration sensor 30c constitute the swing structure IMU sensor 30a (depicted in FIG. 1).

The post-deceleration-stop cylinder stroke prediction section 34b predicts a cylinder stroke after the cylinder is decelerated and stopped (post-deceleration-stop cylinder stroke), based on information from the mass point position and acceleration calculation section 34a and a preset cylinder allowable velocity. A method for calculating the post-deceleration-stop cylinder stroke will be described later.

The stroke end distance calculation and evaluation section 34c calculates the distance from the post-deceleration-stop cylinder stroke predicted by the post-deceleration-stop cylinder stroke prediction section 34b to the stroke end (stroke end distance), and, based on the stroke end distance, determines the presence or absence of the possibility that the cylinder may collide with the stroke end. The method for determining the presence or absence of the possibility of the collision with the stroke end will be described later.

The dynamic center of gravity position prediction section 34d, in the case where it is predicted by the stroke end distance calculation and evaluation section 34c that it is possible for the cylinder to collide with the stroke end, predicts the dynamic center of gravity position of the hydraulic excavator 1 from the start of a decelerating operation of the cylinder to the stop of the cylinder. A calculating method for the dynamic center of gravity position will be described later.

The tipping line distance calculation and evaluation section 34e calculates the distance from the dynamic center of gravity position predicted by the dynamic center of gravity position prediction section 34d to the tipping line of the hydraulic excavator 1 (the tipping line distance), and, based on the tipping line distance, determines the stable state of the hydraulic excavator 1. A discriminating method for the stable state of the hydraulic excavator 1 will be described later.

The allowable velocity changing section 34f changes the cylinder allowable velocity in the vicinity of the stroke end, based on the tipping line distance calculated by the tipping line distance calculation and evaluation section 34e. A changing method for the cylinder allowable velocity will be described later.

The driving command value decision section 34g decides a driving command value for controlling the driving of the cylinder, based on the cylinder allowable velocity changed by the allowable velocity changing section 34f and operation command values from the operation input amount sensors 33a, 33b and 33c, and outputs the driving command value to the drive system 36. A deciding method for the driving command value will be described later.

<Calculating Method for Post-Deceleration-Stop Cylinder Stroke>

The method for calculating the post-deceleration-stop cylinder stroke will be described. The method is carried out by the post-deceleration-stop cylinder stroke prediction section 34b.

The post-deceleration-stop cylinder stroke is obtained by adding a stroke amount by which the cylinder is extended or contracted after a cylinder decelerating operation is started until the cylinder is decelerated and stopped, to the cylinder stroke at the time when the cylinder decelerating operation is started.

Figure 5:
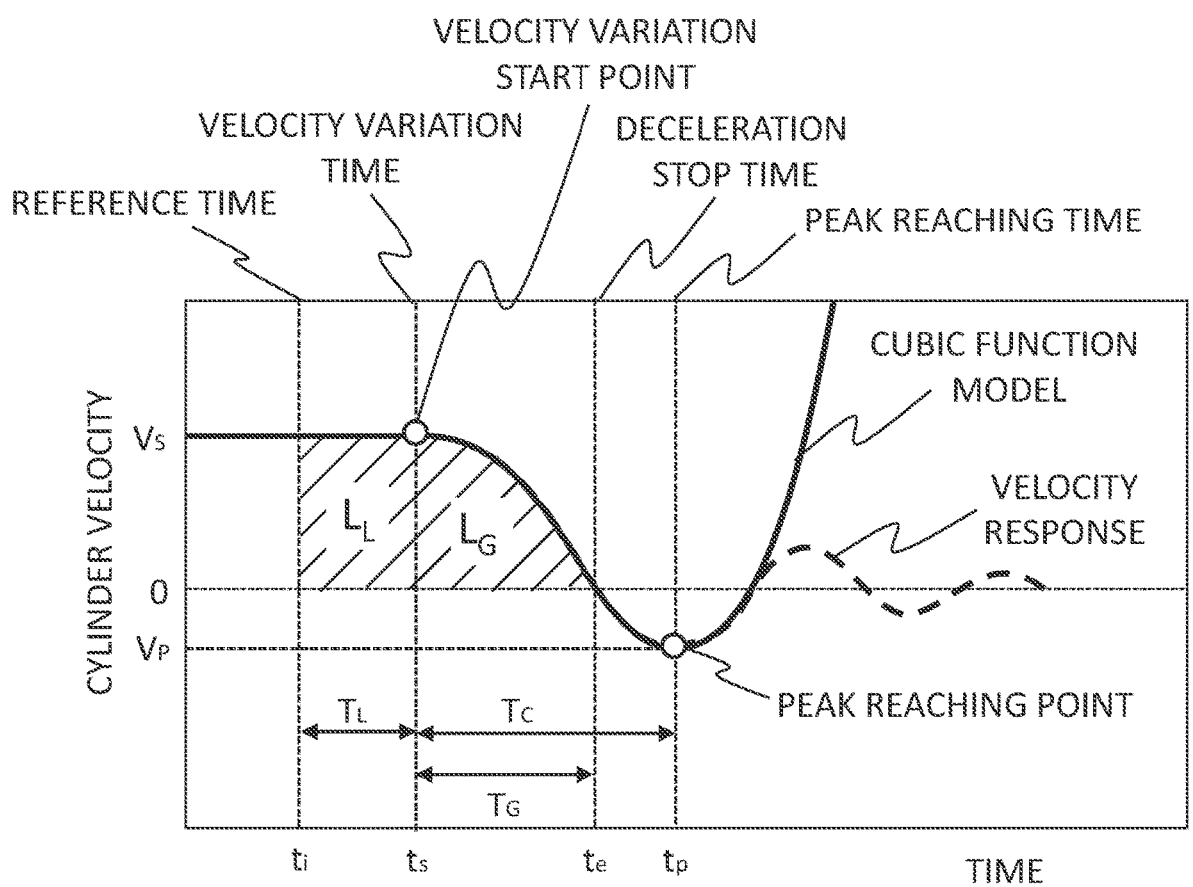
FIG. 5 is a diagram depicting a computation model for obtaining a post-deceleration-stop cylinder stroke.

In the present embodiment, as an example of the method for calculating the post-deceleration-stop cylinder stroke, a method of using a cubic function model depicted in FIG. 5 will be described. FIG. 5 depicts time variation of cylinder velocity when the cylinder is decelerated and stopped.

In FIG. 5, the time when a cylinder decelerating operation is started is reference time $t_i$, the time at a velocity variation start point where the cylinder starts deceleration is velocity variation time $t_s$, the time when the cylinder velocity becomes zero is deceleration stop time $t_e$, and the time when the cylinder overshoots to reach a peak reach point is peak reach time $t_p$.

The cubic function model is a model in which variation in cylinder velocity after a cylinder decelerating operation is started until the cylinder is stopped is approximated with a cubic function with a velocity variation start point and a peak reach point as extreme values. Here, the cylinder velocity at the decelerating operation start time is defined as $V_s$, the velocity at the peak reach time $t_p$ is defined as a peak velocity $V_p$, the ratio of the peak velocity $V_p$ to the velocity variation start velocity $V_s$ is defined as an overshoot ratio $\alpha$, the time from the reference time $t_i$ to the velocity variation start time $t_s$ is defined as a delay time $T_L$, the time from the velocity variation start time $t_s$ to the deceleration stop time $t_e$ is defined as a deceleration stop period $T_G$, and the time from the velocity variation start time $t_s$ to the peak reach time $t_p$ is defined as a peak reach period $T_C$. The overshoot ratio $\alpha$, the delay time $T_L$ and the peak reach period $T_C$ are identified on the basis of each of the cylinders 20A and 21A.

The post-deceleration-stop cylinder stroke is obtained by adding a stroke amount $L_L$ by which the cylinder is extended or contracted from the reference time $t_i$ to the velocity variation time $t_s$ (during the delay time $T_L$) and a stroke amount $L_G$ by which the cylinder is extended or contracted from the velocity variation time $t_s$ to the deceleration stop time $t_e$ (during the deceleration stop period $T_G$) to the cylinder stroke at the time (time $t_i$) when the cylinder decelerating operation is started.

Since the delay time $T_L$ representing the responsiveness of the hydraulic excavator 1 is sufficiently short as compared to the deceleration stop period $T_G$, the stroke amount $L_L$ by which the cylinder is extended or contacted during the delay time $T_L$ can be obtained by multiplying the cylinder velocity $V_s$ at the reference time $t_i$ by the delay time $T_L$, assuming that the cylinder velocity is constant.

The stroke amount $L_G$ by which the cylinder is extended or contracted from the velocity variation time $T_s$ to the deceleration stop time $t_e$ can be obtained by integrating the cubic function from the velocity variation time $T_s$ to the deceleration stop time $t_e$.

Figure 6:
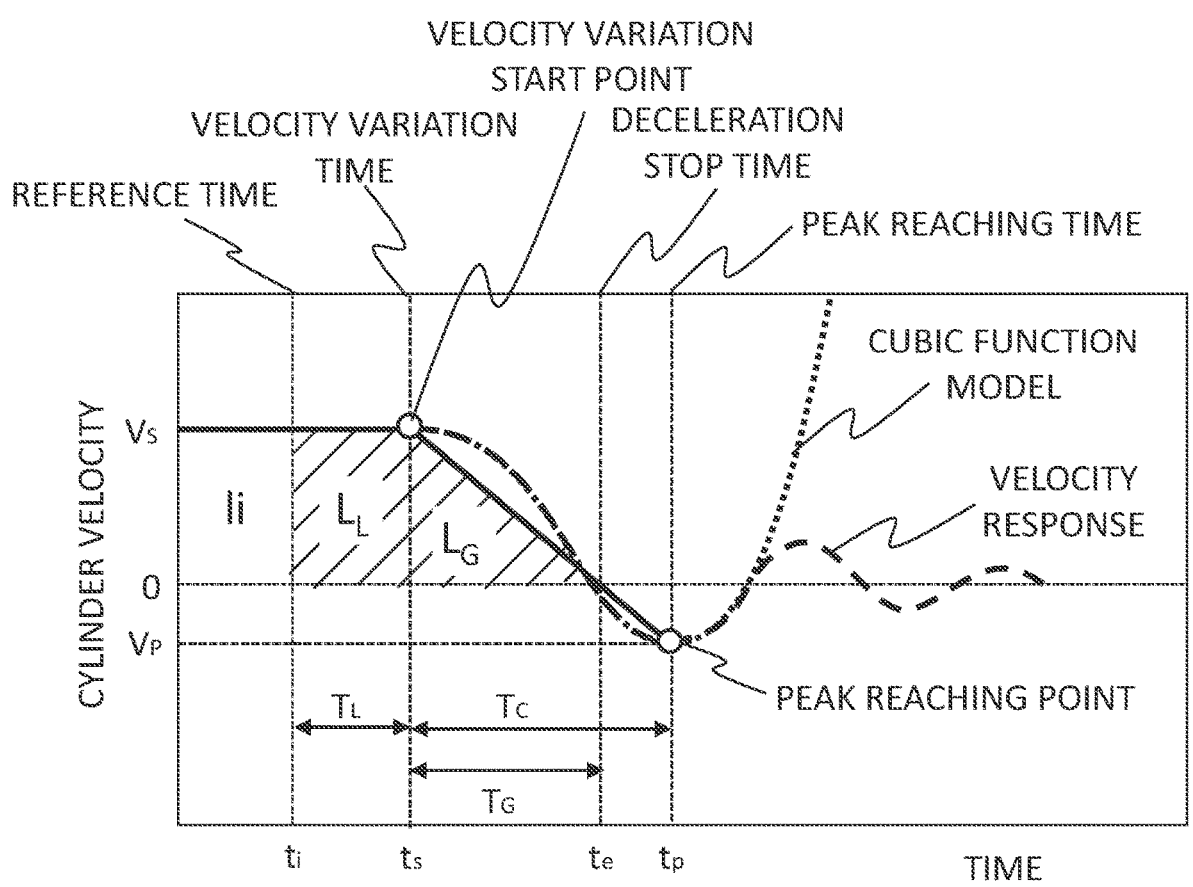
FIG. 6 is a diagram depicting a computation model for obtaining the post-deceleration-stop cylinder stroke.

Note that in consideration of simplicity of mounting, as depicted in FIG. 6, the stroke amount $L_G$ by which the cylinder is extended or contracted from the velocity variation time $t_s$ to the deceleration stop time $t_s$ (during the deceleration stop period $T_G$) may be obtained by approximating the cylinder velocity variation with a linear function connecting the velocity variation start point and the peak reach point, and integrating the linear function.

<Determining Method for Presence or Absence of Possibility of Stroke End Collision>

A method for determining the presence or absence of the possibility of stroke end collision will be described. The method is carried out by the stroke end distance calculation and evaluation section 34c.

The presence or absence of the possibility of collision with the stroke end is determined based on the distance from the post-deceleration-stop cylinder stroke to the stroke end (the stroke end distance). If the stroke end distance is smaller than a predetermined threshold (second threshold), it is determined that the possibility of collision with the stroke end is present, and if the stroke end distance is equal to or larger than the predetermined threshold (second threshold), it is determined that the possibility of collision with the stroke end is absent.

Here, in the case where manufacturing errors of the cylinder are small and the detection accuracy of the IMU sensor is high, the post-deceleration-stop cylinder stroke is calculated with high accuracy, so that a small value can be set as the predetermined threshold (second threshold). In addition, by regulating the predetermined threshold (second threshold) according to the difference between the post-deceleration-stop cylinder stroke and the cylinder stroke when the cylinder is actually decelerated and stopped, the determination accuracy for the presence or absence of the possibility of stroke end collision can be enhanced.

<Calculating Method for Dynamic Center of Gravity Position>

A method for calculating the dynamic center of gravity position of the hydraulic excavator 1 will be described. The method is carried out by the dynamic center of gravity position prediction section 34d.

The dynamic center of gravity position 1Gd of the hydraulic excavator 1 is a center of gravity position obtained by adding influences of inertial forces generated upon operation of the front work implement 2 and the swing structure 3 to the static center of gravity position 1Gs of the hydraulic excavator 1, and is obtained using a ZMP equation given below.

[Math. 1]

$$\sum_i m_i(r_i - r_{ZMP}) \times r_i'' - \sum_j M_j - \sum_k (S_k - r_{ZMP}) \times F_k = 0 \qquad (1)$$

Here, $r_{ZMP}$ . . . ZMP position vector (dynamic center of gravity position vector)
$m_i$ . . . mass of i-th mass point
$r_i$ . . . position vector of i-th mass point
$r_i''$ . . . acceleration vector (inclusive of gravitational acceleration) exerted on i-th mass point
$M_j$ . . . j-th external force moment
$S_k$ . . . k-th external force working point position vector
$F_k$ . . . k-th external force vector.

Note that vectors in the equation (1) are three-dimensional vectors composed of an X component, a Y component and a Z component.

In the present embodiment, no external force is exerted, so that the parts concerning external forces in the equation (1) (the external force moment M and the external force vector $F_k$) are zero. Therefore, the dynamic center of gravity position can be obtained if the mass $m_i$, the position vector $r_i$ and the acceleration vector $r_i''$ of each mass point are known.

In the present embodiment, the acceleration until the cylinder is decelerated and stopped is obtained using the cubic function model depicted in FIG. 5. Since the cubic function depicted in FIG. 5 has the velocity variation start point and the peak reach point as extreme values, the absolute value of acceleration is maximized at an intermediate point between these points. Since the velocity variation time $t_s$ and the peak reach time $t_p$ are known, the inclination of the cubic function at an intermediate time between these times becomes the acceleration. The acceleration can be obtained by differentiating the cubic function at the just-mentioned intermediate time.

In the present embodiment, assuming that the difference between the cylinder operation velocity corresponding to the driving command value and the actual cylinder operation velocity is large, the acceleration is identified using the cubic function with which to approximate the velocity variation in the case where the cylinder is actually decelerated and stopped at a preset cylinder allowable velocity. Note that in the case where the difference between the cylinder operation velocity corresponding to the driving command value and the actual cylinder operation velocity is small, the acceleration may be identified from the cylinder operation velocity corresponding to the driving command value.

<Discriminating Method for Stable State>

A method for determining a stable state of the hydraulic excavator 1 will be described. The method is carried out by the tipping line distance calculation and evaluation section 34e.

The tipping line distance is the distance from the dynamic center of gravity position 1Gd to the tipping line, and can be obtained by subtracting the X component of the dynamic center of gravity position from the X component of the distance tipping line. The stable state of the hydraulic excavator 1 can be discriminated by the magnitude of the tipping line distance. According to a ZMP stability discrimination criterion, it is discriminated that an object comes into an instable state when the tipping line distance becomes equal to or less than zero.

Incidentally, since the hydraulic excavator 1 is used for excavation or loading of earth and sand, it may be used not only on a firm ground surface but also on a weak ground such that the crawler 45 sinks below the ground surface. Therefore, even in the case where the tipping line distance is not reduced to or below zero, the crawler 45 may sink into the ground and the machine body may be tilted, depending on the ground on which the hydraulic excavator 1 is disposed. In view of this, in the present embodiment, it is discriminated that there is no possibility of tilting of the machine body, if the tipping line distance is equal to or more than the predetermined threshold (second threshold).

Here, the predetermined threshold (second threshold) may be decided empirically according to the hardness of the ground on which the hydraulic excavator 1 is used and the magnitude of allowable tilting. In addition, the predetermined threshold (second threshold) may be not a fixed value but a variable value according to the hardness of the ground and the magnitude of allowable tilting.

<Changing Method for Allowable Velocity>

A method for changing the cylinder allowable velocity will be described. The method is carried out by the allowable velocity changing section 34f.

The cylinder allowable velocity is changed based on the tipping line distance. In the present embodiment, in the case where the minimum distance from the trajectory of the dynamic center of gravity position from a time when the cylinder decelerating operation starts to a time when the cylinder stops to the tipping line (minimum tipping line distance) is equal to or greater than a predetermined threshold (second threshold), it is determined that there is no possibility of tilting of the machine body due to an impact at the time of stroke end collision, and the cylinder allowable velocity is changed such that the deceleration of the cylinder increases. On the other hand, in the case where the minimum tipping line distance is smaller than the predetermined threshold (second threshold), it is determined that there is possibility of tilting of the machine body due to an impact at the time of stroke end collision, and the cylinder allowable velocity is changed such that the deceleration of the cylinder decreases.

Figure 7:
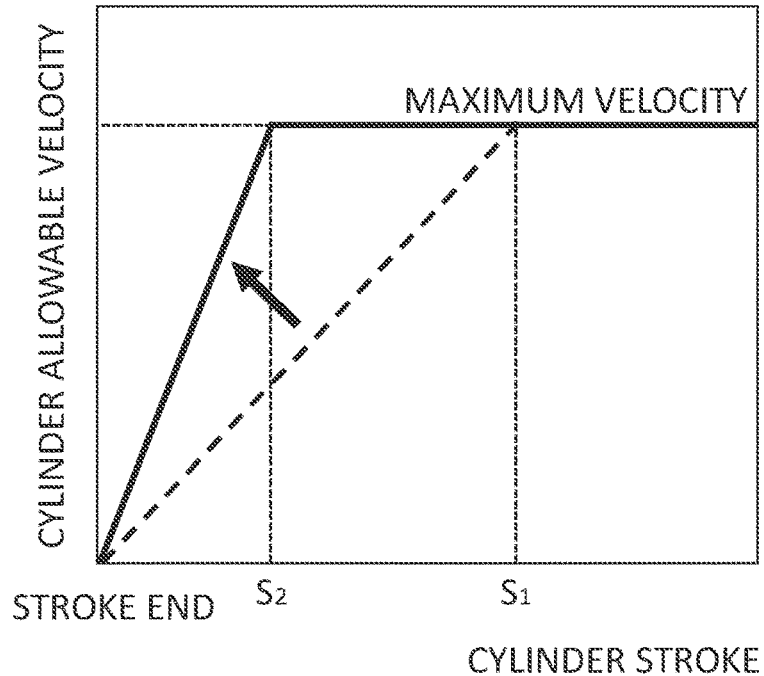
FIG. 7 is a diagram depicting the relation between cylinder stroke and cylinder allowable velocity in the vicinity of a stroke end.
Figure 8:
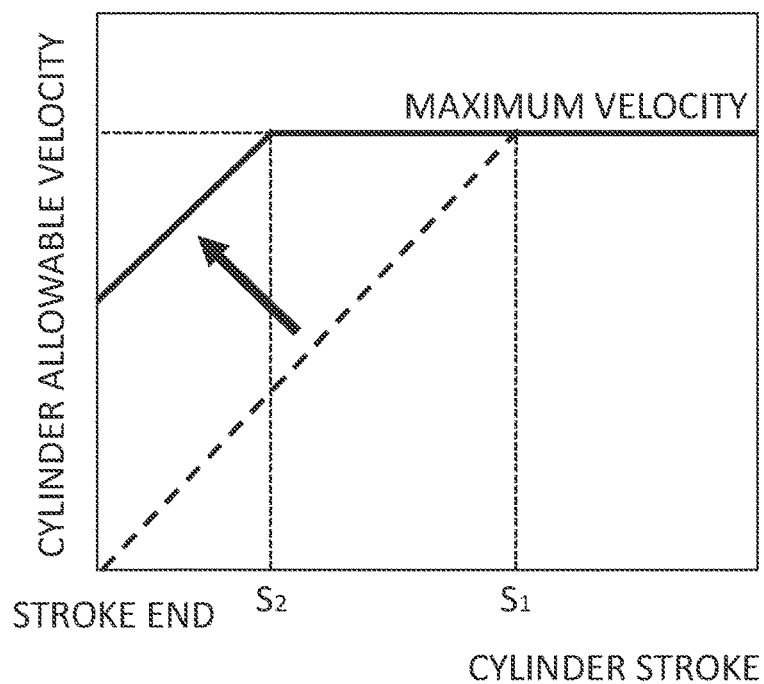
FIG. 8 is a diagram depicting the relation between cylinder stroke and cylinder allowable velocity in the vicinity of the stroke end.
Figure 9:
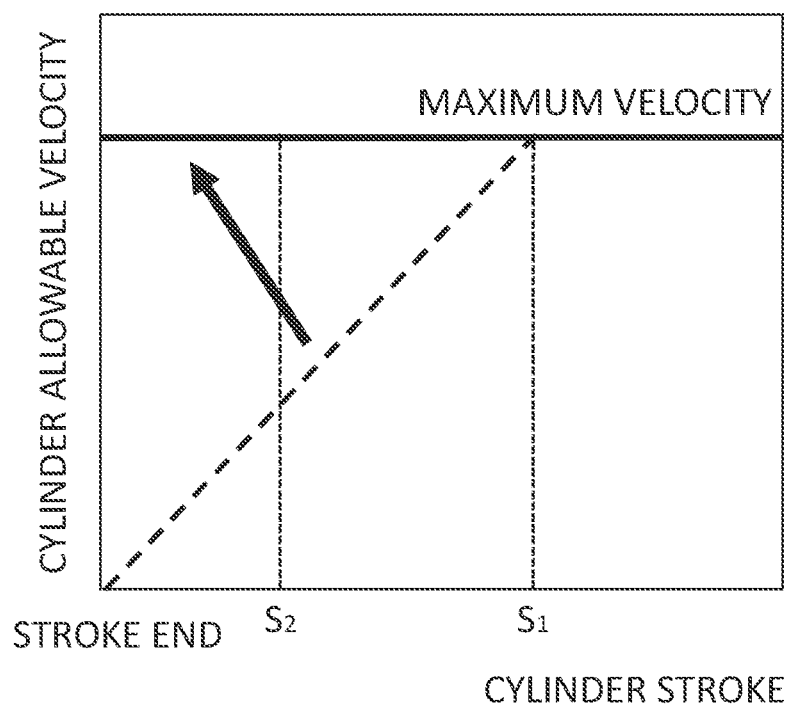
FIG. 9 is a diagram depicting the relation between cylinder stroke and cylinder allowable velocity in the vicinity of the stroke end.

A specific example of the method of changing the cylinder allowable velocity will be described using FIGS. 7 to 9. FIGS. 7 to 9 are diagrams depicting the relation between cylinder stroke and cylinder allowable velocity in the vicinity of the stroke end.

In the example depicted in FIG. 7, the cylinder allowable velocity is changed such that a cylinder stroke S1 at which to start deceleration is a cylinder stroke S2 near the stroke end, whereby the deceleration of the cylinder is increased. As a result, the impact upon stroke end collision can be enlarged. Note that while the cylinder allowable velocity at the stroke end is zero in the example depicted in FIG. 7, the cylinder allowable velocity at the stroke end may not be zero as depicted in FIG. 8. In addition, in the case where the minimum tipping line distance becomes equal to or greater than a predetermined threshold (second threshold) even if the cylinder is made to collide with the stroke end while the cylinder velocity is kept at a maximum velocity, the cylinder allowable velocity can be set to be constant at the maximum velocity to the stroke end, as depicted in FIG. 9. As a result, the impact upon stroke end collision can be maximized.

Figure 10:
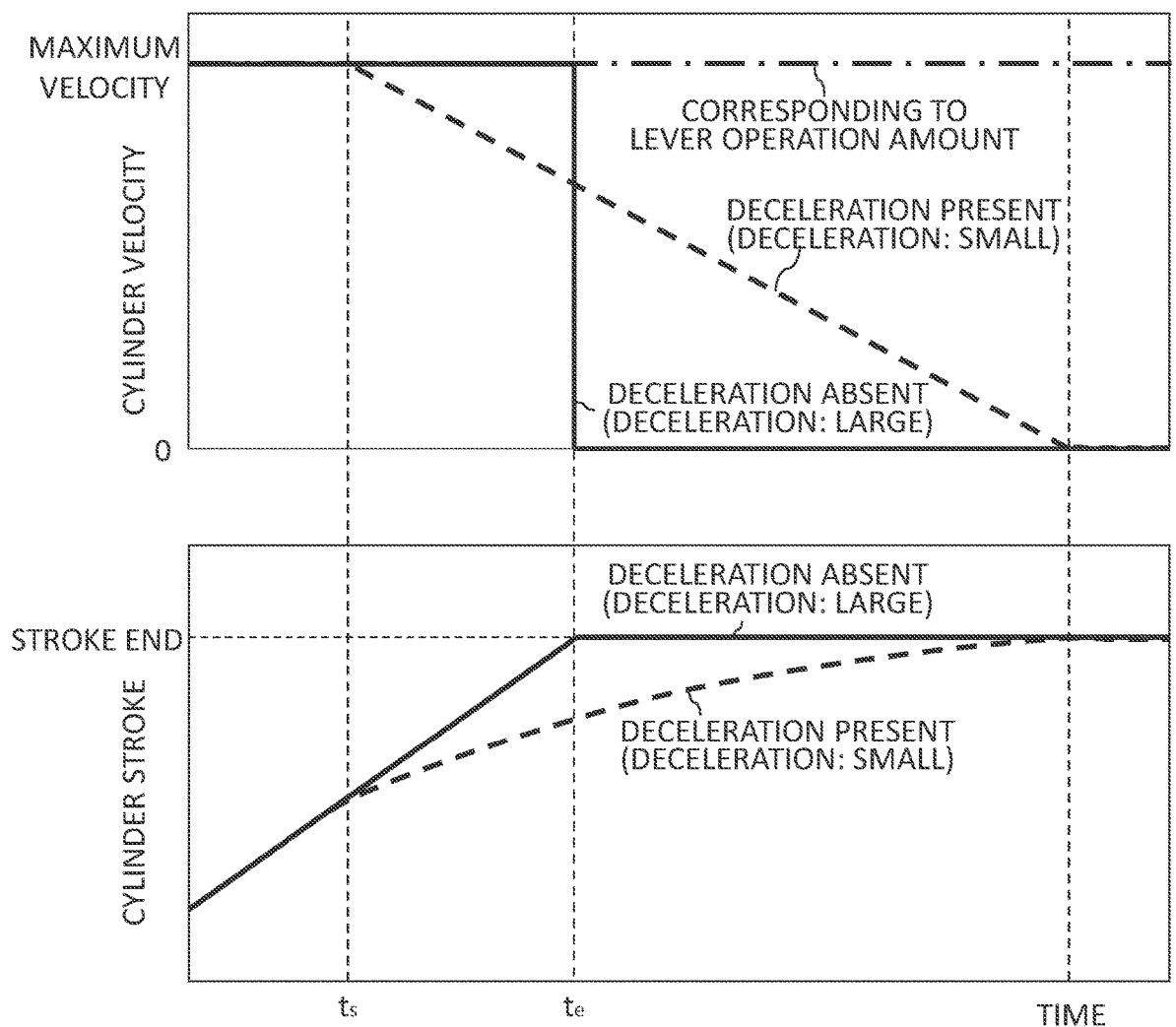
FIG. 10 is a diagram depicting time variations of cylinder velocity and cylinder stroke in the vicinity of the stroke end.

FIG. 10 is a diagram depicting time variations of cylinder velocity and cylinder stroke when the cylinder is stopped at the stroke end.

In the case where the allowable velocity is set such that the deceleration of the cylinder decreases, the lever operation amount is corrected from before the stroke end is reached (time $t_s$), and the cylinder velocity gradually decreases as the stroke end is approached, as indicated by broken line on the upper side. As a result, the cylinder is stopped smoothly, and, therefore, the impact upon stroke end collision is mitigated.

On the other hand, in the case where the allowable velocity is set such that the deceleration of the cylinder increases, the cylinder velocity corresponding to the lever operation amount is maintained until the collision with the stroke end, as indicated by solid line on the upper side. As a result, the cylinder is suddenly stopped at the stroke end, and, therefore, a great impact is generated at the time of stroke end collision.

<Driving Command Value Deciding Method>

A method for deciding a driving command value for the drive system 36 will be described. The method is carried out by the driving command value decision section 34g.

The driving command value is decided based on the lever operation amount and the possibility of collision of the cylinder with the stroke end. When the possibility of collision of the cylinder with the stroke end is absent, a value corresponding to the lever operation amount is made to be the driving command value. On the other hand, when the possibility of collision of the cylinder with the stroke end is present, a cylinder operation velocity corresponding to the lever operation amount and the cylinder allowable velocity are compared with each other, and, when the cylinder operation velocity corresponding to the lever operation amount is equal to or less than the allowable velocity, a value corresponding to the lever operation amount is made to be the driving command value. On the other hand, when the cylinder operation velocity corresponding to the lever operation amount is more than the allowable velocity, a value corresponding to the cylinder allowable velocity is made to be the driving command value.

<Drive Control Means>

FIG. 11 is a flow chart depicting processing of the drive control system 34. The flow is carried out respectively for the boom cylinder 20A and the arm cylinder 21A. The steps will be sequentially described below.

In step S1, the post-deceleration-stop cylinder stroke prediction section 34b predicts a post-deceleration-stop cylinder stroke based on information from the mass point position and acceleration calculation section 34a.

In step S2, the stroke end distance calculation and evaluation section 34c calculates the distance from the post-deceleration-stop cylinder stroke predicted in step S1 to the stroke end (stroke end distance).

In step S3, the stroke end distance calculation and evaluation section 34c determines whether or not the stroke end distance calculated in step S2 is smaller than a predetermined threshold (second threshold). In the case where it is determined that the stroke end distance is equal to or greater than the predetermined threshold (second threshold) (No), the control proceeds to step S11. In the case where it is determined that the stroke end distance is smaller than the predetermined threshold (second threshold) (Yes), the control proceeds to step S4.

In step S4, the dynamic center of gravity position prediction section 34d predicts a trajectory of the dynamic center of gravity position from the time when the cylinder decelerating operation starts to the time when the cylinder stops.

In step S5, the tipping line distance calculation and evaluation section 34e calculates a minimum distance from the trajectory of the dynamic center of gravity predicted in step S4 to the tipping line of the hydraulic excavator 1 (minimum tipping line distance).

In step S6, the tipping line distance calculation and evaluation section 34e determines whether or not the minimum tipping line distance calculated in step S5 is smaller than a predetermined threshold (first threshold). When it is determined that the minimum tipping line distance is equal to or greater than the predetermined threshold (first threshold) (No), the control proceeds to step S7. When it is determined that the minimum tipping line distance is smaller than the predetermined threshold (first threshold) (Yes), the control proceeds to step S8.

In step S7, the cylinder allowable velocity is changed such that the deceleration of the cylinder increases, and the control returns to step S4.

In step S8, a maximum cylinder allowable velocity of cylinder allowable velocities satisfying the condition that the minimum tipping line distance calculated in step S5 is equal to or greater than the predetermined threshold (first threshold) in step S6 is set as a cylinder allowable velocity for deciding the driving command value for the drive system 36.

In step S9, it is determined whether or not the cylinder operation velocity corresponding to the lever operation amount is greater than the cylinder allowable velocity. If it is determined that the cylinder operation velocity is greater than the cylinder allowable velocity (Yes), the control proceeds to step S10. If it is determined that the cylinder operation velocity is equal to or smaller than the cylinder allowable velocity (No), the control proceeds to step S11.

In step S10, a driving command value corresponding to the cylinder allowable velocity is set as the driving command value for the drive system 36, and the control returns to step S1.

In step S11, a driving command value corresponding to the lever operation amount is set as the driving command value for the drive system 36, and the control returns to step S1.

<Effects>

According to the hydraulic excavator 1 configured as above, when it is possible for the cylinders 20A and 21A for driving the front work implement 2 to collide with the stroke end, the cylinder allowable velocity is set in such a manner that the deceleration of the cylinders 20A and 21A increases as the minimum distance from the trajectory of the dynamic center of gravity from the time when a decelerating operation of the cylinders 20A and 21A starts to the time the cylinder 20A, 21 stops to the tipping line (minimum tipping line distance) increases, whereby an impact can be generated upon stroke end collision of the cylinders 20A and 21A within a limit of not harming dynamic stability of the hydraulic excavator 1. As a result, a work utilizing the impact upon the stroke end collision of the cylinders 20A and 21A for driving the front work implement 2 can be performed within the limit of not harming the dynamic stability of the hydraulic excavator 1.

<Others>

While the embodiment of the present invention has been described in detail above, the present invention is not limited to the above embodiment, but includes various modifications. For example, while the hydraulic excavator has been taken as an example in describing the embodiment above, the present invention is applicable to other work machines than the hydraulic excavator. In addition, the above embodiment has been described in detail for explaining the present invention in an easily understandable manner, and the present invention is not limited to embodiments that include all the above-described configurations.

Description of Reference Characters

1: Hydraulic excavator (work machine)
1G: Hydraulic excavator center of gravity
1Gs: Static center of gravity position
1Gd: Dynamic center of gravity position
2: Front work implement
3: Swing structure (machine body)
3G: Swing structure center of gravity
4: Track structure (machine body)
4G: Track structure center of gravity
20: Boom
20a: Boom IMU sensor
20b: Angular velocity sensor
20c: Acceleration sensor
20A: Boom cylinder
20G: Boom center of gravity
21: Arm
21a: Arm IMU sensor
21b: Angular velocity sensor
21c: Acceleration sensor
21A: Arm cylinder
21G: Arm center of gravity
22: Bucket
22a: Bucket IMU sensor
22b: Angular velocity sensor
22c: Acceleration sensor
22A: Bucket cylinder
22G: Bucket center of gravity
22B: Bucket link
22C: Arm link
30a: Swing structure IMU sensor
30b: Angular velocity sensor
30c: Acceleration sensor 31: Main frame
32: Cab
33: Operation input device
33a: Boom operation input amount sensor
33b: Arm operation input amount sensor
33c: Bucket operation input amount sensor
34: Drive control system
34a: Mass point position and acceleration calculation section
34b: Post-deceleration-stop cylinder stroke prediction section
34c: Stroke end distance calculation and evaluation section
34d: Dynamic center of gravity position prediction section
34e: Tipping line distance calculation and evaluation section
34f: Allowable velocity changing section
34g: Driving command value decision section
34A: Calculation block
34B: Control block
35: Engine
36: Drive system
37: Counterweight
40: Track frame
41: Front idler
42a, 42b, 42c: Lower roller
43: Sprocket
44: Upper roller
45: Crawler.

The invention claimed is:

1. A work machine comprising:
a machine body;
a front work implement mounted to a front portion of the machine body in a vertically rotatable manner;
at least one cylinder configured to drive the front work implement;
an operation input device configured to instruct an operation of the cylinder; and
a drive control system configured to control driving of the cylinder in accordance with an instruction from the operation input device,
the drive control system configured to decelerate the cylinder by correcting an operation velocity instructed by the operation input device to or below a preset allowable velocity when the cylinder approaches a stroke end,
wherein the drive control system includes
a stroke end distance calculation and evaluation section configured to determine whether or not it is possible for the cylinder to collide with the stroke end,
a dynamic center of gravity position prediction section configured to predict a trajectory of the dynamic center of gravity position of the work machine from a time when a deceleration operation of the cylinder starts to a time when the cylinder stops, when it is determined by the stroke end distance calculation and evaluation section that it is possible for the cylinder to collide with the stroke end, and
an allowable velocity changing section configured to change the allowable velocity in accordance with a minimum distance from the trajectory of the dynamic center of gravity position predicted by the dynamic center of gravity position prediction section to a tipping line of the work machine.

2. The work machine according to claim 1,
wherein the allowable velocity changing section is configured to change the allowable velocity in such a manner that the deceleration of the cylinder increases when the minimum distance is greater than a predetermined first threshold.

3. The work machine according to claim 1,
wherein the drive control system further includes a post-deceleration-stop cylinder stroke prediction section configured to predict a cylinder stroke after the cylinder is decelerated and stopped, and
the stroke end distance calculation and evaluation section is configured to determine that it is possible for the cylinder to collide with the stroke end, when the distance from the cylinder stroke predicted by the post-deceleration-stop cylinder stroke prediction section to the stroke end is smaller than a predetermined second threshold.

* * * * *